(12) United States Patent
Tennebroek et al.

(10) Patent No.: US 7,569,636 B2
(45) Date of Patent: Aug. 4, 2009

(54) AQUEOUS PIGMENTED COATING COMPOSITION WITH IMPROVED OPEN TIME COMPRISING CROSSLINKABLE OLIGOMER(S) AND DISPERSED POLYMER(S)

(75) Inventors: Ronald Tennebroek, Waalwijk (NL);
Tijs Nabuurs, Waalwijk (NL);
Gerardus C Overbeek, Waalwijk (NL);
Jan Bouman, Waalwijk (NL)

(73) Assignee: DSM IP assets B.V., Heerlen (NL)

( * ) Notice: Subject to any disclaimer, the term of this patent is extended or adjusted under 35 U.S.C. 154(b) by 632 days.

(21) Appl. No.: 10/551,046

(22) PCT Filed: Mar. 22, 2004

(86) PCT No.: PCT/GB2004/001227

§ 371 (c)(1),
(2), (4) Date: Sep. 27, 2005

(87) PCT Pub. No.: WO2004/085556

PCT Pub. Date: Oct. 7, 2004

(65) Prior Publication Data

US 2006/0217483 A1     Sep. 28, 2006

(30) Foreign Application Priority Data

Mar. 28, 2003 (GB) .................................. 0307246.9

(51) Int. Cl.
*C08J 3/02* (2006.01)
(52) U.S. Cl. .................. 524/501; 524/502; 524/504; 524/505; 524/506; 524/507; 524/513; 524/514; 524/515
(58) Field of Classification Search ................ 524/501, 524/502, 504, 505, 506, 507, 513, 514, 515
See application file for complete search history.

(56) References Cited

FOREIGN PATENT DOCUMENTS

| WO | WO 97/12945 | 10/1997 |
|---|---|---|
| WO | WO 02/32982 | 4/2002 |
| WO | WO 02/33013 | 4/2002 |

OTHER PUBLICATIONS

International Search Report.

*Primary Examiner*—Edward J Cain
(74) *Attorney, Agent, or Firm*—Nixon & Vanderhye P.C.

(57) ABSTRACT

An aqueous coating composition with an improved open time comprising (a) a crosslinkable water-dispersible oligomer(s); (b) a dispersed polymer(s), (c) a pigment(s) with an oil absorption number $\leq 25$ g oil/100 g pigment and optionally (d) a Newtonian-like thickener(s) and (e) a thixotropic thickener(s) wherein the weight ratio of (a):(b) is in the range of from 10:90 to 60:40; wherein (d)+(e)=0.1 to 10 wt % and wherein said composition when drying to form a coating has a tack-free time of $\leq 24$ hours.

25 Claims, No Drawings

AQUEOUS PIGMENTED COATING COMPOSITION WITH IMPROVED OPEN TIME COMPRISING CROSSLINKABLE OLIGOMER(S) AND DISPERSED POLYMER(S)

This application is the US national phase of international application PCT/GB2004/001227 filed 22 Mar. 2004 which designated the U.S. and claims benefit of GB 0307246.9, dated 28 Mar. 2003, the entire content of which is hereby incorporated by reference.

The present invention relates to certain pigmented compositions comprising a crosslinkable water-dispersible oligomer(s) and a dispersed polymer(s) which, inter alia, provide coatings having improved open times as well as good tack-free times.

A general need when applying a decorative or protective coating to a substrate, is to be able to repair irregularities in the still-wet coating after some time has elapsed, for example by re-brushing over a freshly coated wet substrate, or by applying more of the coating composition over a previously coated substrate without vitiating the complete merging of any boundaries in the vicinity of the repaired irregularity. Traditionally compositions containing binder polymers dissolved in organic solvents are used and the organic solvents are employed to modify the drying characteristics of the coated composition. However a disadvantage of organic solvent based coatings is the toxic and flammable nature of such solvents and the pollution and odour caused on evaporation as well as the relatively high cost of organic solvents.

Thus with the continuing concern about the use of organic solvent based coating compositions there has been a long felt need for an aqueous coating composition with comparable properties to those achievable using organic solvent based compositions.

It has been shown by viscosity measurements taken during drying that existing alkyd emulsions have a high viscosity phase inversion peak during drying. (Phase inversion is defined as the transition from a binder in a continuous water phase to water in a continuous binder phase, which occurs during drying). The consequence is a difficulty in re-brushing which starts a few minutes after application of the coating to a substrate.

It is known from the prior art that a longer open time is achievable by using solution-type aqueous oligomers (EP 0136025 B1) which can be diluted with large amounts of organic solvent(s) in order to create a low viscosity continuous phase during drying of the film and these are generally unacceptably water-sensitive.

From the literature it is also known that using low solids contents in the aqueous polymer compositions easily prolongs open time, but this generally results in the need to apply many layers of paint (for good opacity). Longer times for repairing irregularities can be achieved by employing aqueous polymer coating compositions in which the binder polymers have very low viscosities. However, hitherto, a problem with using such low viscosity polymer binders, is that the resultant coatings have a slow drying rate, resulting in the coating remaining tacky for an unacceptably long time. A coating should preferably also dry sufficiently quickly to avoid the adherence of dust and to ensure that the coating quickly becomes waterproof (in case of outdoor applications), and quickly becomes tack-free.

WO 02/32980, WO 02/33008, WO 02/33012 and WO 02/32982 disclose the use of compositions comprising a crosslinkable oligomer(s) and a dispersed polymer(s) with a specified equilibrium viscosity to give improved open times and tack-free times.

However it is desirable to still further control the rheology of a coating composition beyond the point where most of the water has evaporated.

Many coatings compositions contain pigments. Pigments are often selected depending on their dispersibility, gloss, hiding power (opacity) and exterior durability when incorporated into a coating composition. In the art titanium dioxide ($TiO_2$) is considered as a commercially important white pigment and $TiO_2$ (and inorganic pigments in general) may be classified according to for example their particle size and particle size distribution; density; titanium (or metal) content; surface treatment; oil absorption number and/or water absorption number. Thus for example heavily silica treated $TiO_2$ pigments in general exhibit a low titanium content and high oil and water absorption numbers.

We have found that some of the pigment properties, in particular the oil and water absorption numbers can influence the rheology of a composition and therefore the open time.

Coating compositions also often contain thickeners. Aqueous coating compositions are generally shear thinning due to their particulate nature. As a result paints made from such compositions will have a low viscosity during brushing resulting in only thin layers being applied, with poor flow and poor levelling. This brushing behaviour can be improved by adding thickeners to increase the viscosity however this usually makes the flow and levelling worse, resulting in a reduced open time.

We have found that some thickeners can be used to give improved Theological behaviour and open time.

We have now invented aqueous coating compositions having an improved advantageous combination of drying properties, particularly with regard to open time and tack-free time as discussed above.

According to the present invention there is provided an aqueous coating composition with an improved open time comprising:
 a) 1 to 35 wt % of a crosslinkable water-dispersible oligomer(s);
 b) 4 to 50 wt % of a dispersed polymer(s);
 c) 3 to 75 wt % of a pigment(s) with an oil absorption number $\leq 25$ g oil/100 g pigment;
 d) 0 to 10 wt % of a Newtonian-like thickener(s);
 e) 0 to 10 wt % of a thixotropic thickener(s);
 f) 0 to 20 wt % of co-solvent;
 g) 10 to 80 wt % of water;
 where a)+b)+c)+d)+e)+f)+g)=100%;
 wherein the weight ratio of a):b) is in the range of from 10:90 to 60:40; wherein d)+e)=0.1 to 10 wt % and wherein said composition when drying to form a coating has a tack-free time of $\leq 24$ hours.

The presence of the crosslinkable water-dispersible oligomer(s) (as discussed above) provides the improved open time, whilst the presence of the dispersed polymer(s) (e.g. in the form of a polymer latex) appears to assist in reducing the drying time of the composition.

The open time for an aqueous coating composition is, in brief, the period of time that the main area (the bulk) of an aqueous coating composition remains workable after it has been applied to a substrate, in the sense that during this period re-brushing or application of more of the aqueous coating composition over the main area of a freshly coated wet substrate is possible and still results in a homogeneous film layer.

Open time is more formally defined as the maximum length of time, using the test method and under the specified conditions described later, in which a brush carrying the aqueous composition of the invention can be applied to the main area of a coating of the aqueous composition of the invention after which the coating flows back so as to result in a homogenous film layer.

Preferably the improved open time of the aqueous composition of the invention is at least 3, more preferably at least 4, most preferably at least 6 and especially at least 8 minutes longer than a reference formulation.

The reference formulation contains similar amounts of components a), b), f) and g) to the aqueous composition of the invention where by a similar amount is meant that the amount may vary as follows: a)+/−0.5 wt %, b)+/−0.5 wt %, f)+/−0.6 wt % and g)+/−1.0 wt %.

For the reference formulation component c) is replaced with a similar amount of a titanium dioxide pigment with an oil absorption number of >32 g oil/100 g pigment and a water absorption number of >40 cm$^3$/100 g pigment. Examples of such pigments include Tioxide TR50 and Kronos 2044. The amount of such pigments may vary by +/−1.5 wt %.

For the reference formulation components d) and e) together are replaced with Borchigel™L75N, in an amount which will give a viscosity of 2000 to 5000 mPa·s at 6 rpm and at 20+/−3° C., when measured with a Brookfield DV-11+ viscometer, spindle #4.

Preferably for the reference formulation components d) and e) together are replaced with a similar amount of Borchigel™ L75N where the amount may vary by +/−1.0 wt %.

Preferably the open time of the aqueous composition of the invention is at least 9 minutes, more preferably at least 14 minutes and most preferably at least 17 minutes.

The crosslinkable water-dispersible oligomer(s) may comprise a single crosslinkable oligomer or a mixture of crosslinkable oligomers. Crosslinkable oligomer(s) include but are not limited to for example polyurethane oligomer(s), vinyl oligomer(s), polyamide oligomer(s), polyether oligomer(s), polysiloxane oligomer(s) and/or polyester oligomer(s) and the crosslinkable oligomer(s) may optionally be branched (such branched oligomer(s) may also be known as hyperbranched oligomer(s). Preferably said crosslinkable oligomer(s) is selected from group comprising polyurethane oligomer(s), vinyl oligomer(s), polyamide oligomer(s), polyether oligomer(s), polysiloxane oligomer(s), polyester oligomer(s), hyperbranched oligomer(s) and/or mixtures thereof. More preferably the crosslinkable oligomer(s) is selected from a group consisting of polyurethane oligomer(s), vinyl oligomer(s), polyester oligomer(s), hyperbranched oligomer(s) and/or mixtures thereof.

The crosslinkable water-dispersible oligomer(s) may crosslink at ambient temperature by a number of mechanisms including but not limited to autoxidation, Schiff base crosslinking and silane condensation. By crosslinking by autoxidation is meant that crosslinking results from an oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s), where by a carbonyl functional group herein is meant an aldo or keto group and includes an enolic carbonyl group such as is found in an acetoacetyl group with a carbonyl-reactive amine and/or hydrazine functional group. Examples of carbonyl-reactive amine functional groups include ones provided by the following compounds or groups: R—NH$_2$, R—O—NH$_2$, R—O—N═C<, R—NH—C(═O)—O—N═C< and R—NH—C(═O)—O—NH$_2$ where R is optionally substituted $C_1$ to $C_{15}$, preferably $C_1$ to $C_{10}$, alkylene, optionally substituted alicyclic or optionally substituted aryl or R may also be part of a polymer. Examples of carbonyl-reactive hydrazine compounds or groups include R—NH—NH$_2$, R—C(═O)—NH—NH$_2$, R—C(═O)—NH—N═C<, R—NH—C(═O)—NH—NH$_2$ and R—NH—C(═O)—NH—N═C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Other crosslinking mechanisms known in the art include those provided by the reaction of epoxy groups with amino, carboxylic acid or mercapto groups or masked mercapto groups such as 5-(methacryloyloxy)methyl-1,3-oxathiolane-2-thione), the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylenediamine or multifunctional amine terminated polyalkylene oxides) with β-diketo (for example acetoacetoxy or acetoamide) groups to form enamines. The use of blocked crosslinker groups may be beneficial.

Preferably the crosslinkable water-dispersible oligomer(s) is a self-crosslinkable oligomer(s) (i.e. crosslinkable without the requirement for added compounds, which react with groups on the crosslinkable oligomer(s) to achieve crosslinking, although these can still be employed if desired).

Preferably the crosslinking is by autoxidation, optionally in combination with other crosslinking mechanisms as discussed herein. Suitably autoxidation is provided for example by fatty acid groups containing unsaturated bonds (by which is meant the residue of such fatty acids which have become incorporated into the oligomer by reaction at their carboxylic acid groups) or by (meth)allyl functional residues, β-keto ester groups or β-keto amide groups. Preferably autoxidation is provided by fatty acid groups containing unsaturated bonds.

Preferably the concentration of unsaturated fatty acid groups if present in the crosslinkable water-dispersible oligomer(s) is 10 to 80%, more preferably 12 to 70%, most preferably 15 to 60% by weight based on the weight of the crosslinkable oligomer(s). If combined with other autoxidisable groups in the aqueous coating composition, the fatty acid content may be below 10% by weight of the crosslinkable oligomer(s). For the purpose of determining the fatty acid group content of the crosslinkable oligomer(s), it is convenient for practical purposes to use the weight of the fatty acid reactant including the carbonyl group but excluding the hydroxyl group of the terminal acid group of the fatty acid. Suitable unsaturated fatty acids for providing fatty acid groups in the oligomer(s) include fatty acids derived from vegetable oil or non-vegetable oil such as soybean oil, palm oil, linseed oil, tung oil, rapeseed oil, sunflower oil, tallow oil, (dehydrated) castor oil, safflower oil and fatty acids such as linoleic acid, linolenic acid, palmitoleic acid, oleic acid, eleostearic acid, licanic acid, arachidonic acid, ricinoleic acid, erucic acid, gadoleic acid, clupanadonic acid and/or combinations thereof. Particularly preferred is a crosslinkable oligomer(s) in which the autoxidisable groups are only derived from unsaturated fatty acids. Preferably at least 40% by weight, more preferably at least 60% by weight, of the unsaturated fatty acid groups contain at least two unsaturated groups.

The crosslinkable water-dispersible oligomer(s) may be completely water-soluble or only have partial or low solubility in water. Preferably the crosslinkable oligomer(s) only has partial or little solubility in water. If the crosslinkable oligomer(s) is only partially or little soluble in water, it preferably has low water solubility in a pH range of from 2 to 10 and is either self-dispersible in water (i.e. dispersible by virtue of a sufficient concentration of selected bound (in-chain, chain-pendant and/or chain-terminal) hydrophilic groups built into the crosslinkable oligomer(s), and thus not requiring high shear techniques and/or added surfactants to produce the dispersion, although such methods can also be included if desired), or is only dispersible in water with the aid of added (i.e. external) surface active agents and/or the use of high shear mixing. Low water solubility confers the advantage of a reduced water-sensitivity of the applied coating. Such low water solubility is defined herein as the crosslinkable oligomer(s) being less than 70% by weight soluble in water throughout the pH range of from 2 to 10 as determined for example by a centrifuge test as described herein. Preferably the crosslinkable oligomer(s) is $\leq 60\%$, more preferably $\leq 50\%$ most preferably $\leq 30\%$ by weight soluble in water throughout the pH range of from 2 to 10. The crosslinkable oligomer(s) preferably contains a sufficient concentration of bound hydrophilic water-dispersing groups capable of rendering the oligomer(s) self-water-dispersible, but the concentration of such groups is preferably not so great that the oligomer(s) has an unacceptably high water solubility in order to not compromise the water sensitivity of the final coating.

The type of hydrophilic groups capable of rendering the water-dispersible crosslinkable oligomer(s) self-water-dispersible are well known in the art, and can be ionic water-dispersing groups (or a group which may be subsequently converted to such a water-dispersing group, e.g. by neutralisation, such a group still being termed a water-dispersing group for the purposes of this invention) or non-ionic water-dispersing groups. Preferred non-ionic water-dispersing groups are polyalkylene oxide groups, more preferably polyethylene oxide groups. A small segment of the polyethylene oxide group may be replaced by propylene oxide segment(s) and/or butylene oxide segment(s), however the polyethylene oxide group should still contain ethylene oxide as a major component. When the water-dispersible group is polyethylene oxide, the ethylene oxide group preferably has a Mw from 175 to 5000 Daltons, more preferably from 350 to 2200 Daltons, most preferably from 660 to 1100 Daltons. Preferably the crosslinkable oligomer(s) has a polyethylene oxide content of 0 to 50% by weight, more preferably 0 to 39% by weight and most preferably 2 to 35% by weight.

Preferred ionic water-dispersing groups are anionic water-dispersing groups, especially carboxylic, phosphoric and/or sulphonic acid groups. The anionic water-dispersing groups are preferably fully or partially in the form of a salt. Conversion to the salt form is optionally effected by neutralisation of the crosslinkable oligomer(s) with a base, preferably during the preparation of the crosslinkable oligomer(s) and/or during the preparation of the composition of the present invention. The anionic dispersing groups may in some cases be provided by the use of a monomer having an already neutralised acid group in the crosslinkable oligomer(s) synthesis so that subsequent neutralisation is unnecessary. If anionic water-dispersing groups are used in combination with non-ionic water-dispersing groups, neutralisation may not be required.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives counter ions that may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and/or quaternary ammonium groups, which may be neutralised or permanently ionised (for example with dimethylsulphate).

The crosslinkable water-dispersible oligomer(s) may be dispersed in water using techniques well known in the art. Preferably, the crosslinkable oligomer(s) is added to the water with agitation or, alternatively, water may be stirred into the crosslinkable oligomer(s).

Surfactants and/or high shear can be utilised in order to assist in the dispersion of the crosslinkable water-dispersible oligomer(s) in water (even if it is self-dispersible). Suitable surfactants include but are not limited to conventional anionic, cationic and/or non-ionic surfactants such as Na, K and $NH_4$ salts of: dialkylsulphosuccinates, salts of sulphated oils; alkyl sulphonic acids; alkyl sulphates; and fatty acids, as well as alkali metal salts of sulphonic acids; fatty alcohols, ethoxylated fatty acids and/or fatty amides. Other anionic surfactants include phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15% by weight, more preferably 0 to 8% by weight, still more preferably 0 to 5% by weight, especially 0.1 to 3% by weight, and most especially 0.3 to 2% by weight based on the weight of the crosslinkable oligomer(s).

The crosslinkable water-dispersible oligomer(s) preferably has a measured weight average molecular weight (Mw) in the range of from 1,000 to 100,000 Daltons, more preferably in the range of from 1,200 to 80,000 Daltons, most preferably in the range from 1,200 to 65,000 Daltons, especially in the range of from 1,500 to 50,000 Daltons, more especially in the range of from 2,200 to 40,000 Daltons and most especially in the range of from 2,200 to 20,000 Daltons.

For the purpose of this invention any molecular species with a molecular weight <1000 Daltons is classified as either a reactive diluent or a plasticiser and is therefore not taken into account for the determination of Mn, Mw or PDi. Plasticisers are defined as liquid compounds with a molecular weight of 200 up to 1000 Daltons. Preferably the amount of plasticiser % by weight based on the solids content of the composition is $\leq 15$ wt %, preferably $\leq 8$ wt %, more preferably $\leq 3$ wt % and most preferably 0 wt %.

The molecular weight distribution (MWD) of the crosslinkable water-dispersible oligomer(s) may have an influence on the viscosity of the aqueous composition of the invention, and hence an influence on the open time. MWD is conventionally described using the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable oligomer(s). Preferably the value of PDi of the water-dispersible crosslinkable oligomer(s) is $\leq 15$, more preferably $\leq 10$, and most preferably $\leq 5$.

The crosslinkable water-dispersible oligomer(s) preferably has an acid value of in the range of from 0 to 80 mg KOH/g, more preferably in the range of from 0 to 50 mgKOH/ g, still more preferably in the range of from 0 to 40 mg KOH/g, most preferably in the range of from 2 to 30 mg KOH/g and especially in the range of from 3 to 25 mgKOH/g.

The glass transition temperature (Tg) of the crosslinkable water-dispersible oligomer(s) may vary within a wide range. The Tg (as measured by modulated DSC) is preferably in the range of from −120 to 250° C., more preferably in the range of from −120 to 100° C., still more preferably in the range of from −70 to 70° C., and especially in the range of from −50 to 20° C. Additional preferences for Tg, Mw and acid values for individual types of crosslinkable water-dispersible oligomer(s) are given below.

Preferably the composition comprises 2 to 28 wt %, more preferably 3 to 20 wt % and most preferably 4 to 15 wt % of a crosslinkable water-dispersible oligomer(s).

The water-dispersible crosslinkable oligomer(s), if a polyurethane oligomer(s), may be prepared in a conventional manner by reacting an organic polyisocyanate with an isocyanate reactive compound. Isocyanate-reactive groups include —OH, —SH, —NH—, and —NH$_2$.

Methods for preparing polyurethanes are known in the art and are described in for example the Polyurethane Handbook 2$^{nd}$ Edition, a Carl Hanser publication, 1994, by G. Oertel; and these methods are included herein by reference. In some preparations, an isocyanate-terminated polyurethane prepolymer is first formed which is then chain extended with an active hydrogen containing compound.

Suitable polyisocyanates include aliphatic, cycloaliphatic, araliphatic and/or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate and 1,5-naphthylene diisocyanate. Mixtures of polyisocyanates can be used and also polyisocyanates which have been modified by the introduction of urethane, allophanate, urea, biuret, carbodiimide, uretonimine, urethdione or isocyanurate residues can be used.

Crosslinkable water-dispersible polyurethane oligomer(s) containing crosslinker groups are preferably obtained by employing as a reactant in the urethane synthesis at least one isocyanate-reactive organic compound bearing a crosslinker group(s). Alternatively, but less preferably, an isocyanate functional compound bearing a crosslinker group(s) may be used.

Hydrophilic water-dispersing groups, if present, are preferably introduced by employing as a reactant(s) in the urethane synthesis at least one isocyanate-reactive compound (or less preferably an isocyanate-functional compound(s)) bearing a non-ionic and/or ionic water-dispersing group(s) (as described above) as a reactant in the preparation of the crosslinkable polyurethane oligomer or prepolymer thereof. Examples of such compounds include carboxyl group containing diols and triols, for example dihydroxy alkanoic acids such as 2,2-dimethylolpropionic acid or 2,2-dimethylolbutanoic acid. Examples of preferred compounds bearing nonionic water-dispersing groups include methoxy polyethylene glycol (MPEG) with molecular weights of for example 350, 550, 750, 1000 and 2000, as described in EP 0317258.

Other isocyanate-reactive organic compounds bearing no hydrophilic water-dispersing groups which may be used in the preparation of crosslinkable polyurethane oligomer(s) or polyurethane prepolymers preferably contain at least one (more preferably at least two) isocyanate-reactive groups, and are more preferably organic polyols. The organic polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 250 to 6000, more preferably from 500 to 3000. Low molecular weight organic compounds containing at least one (more preferably at least two) isocyanate-reactive groups and having a weight average molecular weight up to 500, preferably in the range of 40 to 250 can also be used. Examples include ethyleneglycol, neopentyl glycol, 1-propanol, and 1,4-cyclohexyldimethanol.

When an isocyanate-terminated polyurethane prepolymer is prepared, it is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.1:1 to about 6:1, preferably from about 1.5:1 to 3:1.

Alternatively a hydroxyl-terminated crosslinkable polyurethane oligomer(s) may be prepared directly by reacting the reactants in proportions corresponding to a ratio of isocyanate groups to isocyanate-reactive groups of from about 0.4:1 to about 0.99:1, preferably from about 0.55:1 to 0.95:1.

If desired, catalysts such as dibutyltin dilaurate and stannous octoate, zirconium or titanium based catalysts may be used to assist the crosslinkable polyurethane oligomer(s) formation. An organic solvent may optionally be added before or after prepolymer or final oligomer formation to control the viscosity. Examples of solvents include water-miscible solvents such as 1-methyl-2-pyrrolidinone, dimethyl acetamide, glycol ethers such as butyldiglycol, 2-propanone and alkyl ethers of glycol acetates or mixtures thereof. Optionally and preferably no organic solvents are added.

An aqueous crosslinkable polyurethane oligomer(s) dispersion may also be prepared, when the prepolymer/chain extension route was employed, by dispersing the isocyanate-terminated polyurethane prepolymer (optionally carried in an organic solvent medium) in an aqueous medium and chain extending the prepolymer with active hydrogen-containing chain extender in the aqueous phase.

Active hydrogen-containing chain extenders, which may be reacted with the isocyanate-terminated polyurethane prepolymer, include amino-alcohols, primary or secondary diamines or polyamines, hydrazine, and substituted hydrazines.

Examples of such chain extenders useful herein include alkylene diamines such as ethylene diamine and cyclic amines such as isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazine such as gammahydroxylbutyric hydrazide, bissemi-carbazide and bis-hydrazide carbonic esters of glycols may be useful. Water itself may be effective as an indirect chain extender.

Where the chain extender is other than water, for example a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein.

Optionally a combination of chain extender(s) and chain terminator(s) may be used. Examples of chain terminators are mono-functional isocyanate-reactive compounds such as mono-alcohols, mono-amines, mono-hydrazines and mono-mercaptanes. The ratio of chain extender to chain terminator compounds is preferably in the range of from 95:5 to 5:95, more preferably 50:50 to 10:90 and most preferably 35:65 to 20:80.

The total amount of chain extender and chain terminating materials employed (apart from water) should be such that the ratio of active hydrogens in the chain extender(s) to isocyanate groups in the polyurethane prepolymer preferably is in the range from 0.1:1 to 2.0:1 more preferably 0.80:1 to 1.7:1.

Any other known methods for preparing polyurethane dispersions such as a ketamine/ketazine process or a hot process as described in "Progress in Organic Coatings", D. Dietrich, 9, 1981, p 281) may also be utilised.

The crosslinkable water-dispersible polyurethane oligomer(s) preferably has at least one glass transition temperature (Tg) in the range of from −50 to 0° C.

The crosslinkable water-dispersible oligomer(s) if a polyester oligomer(s) can be prepared using conventional polymerisation procedures known to be effective for polyester synthesis. General processes for the preparation of polyesters are described in "Alkyd Resin Technology" by T C Patton, Publisher John Wiley & sons Inc. (1962). It is known that polyesters, which contain carbonyloxy (i.e. —C(=O)—O—) linking groups may be prepared by a condensation polymerisation process in which a monomer(s) providing an "acid component" (including ester-forming derivatives thereof) is reacted with a monomer(s) providing a "hydroxyl component". The monomer(s) providing an acid component may be selected from one or more polybasic carboxylic acids such as di- or tri-carboxylic acids or ester-forming derivatives thereof such as acid halides, anhydrides or esters. The monomer(s) providing a hydroxyl component may be one or more polyhydric alcohols or phenols (polyols) such as diols, triols, etc. Mono-functional acid and hydroxy components may also be included in the preparation of the crosslinkable polyester oligomer(s). (It is to be understood, however, that the crosslinkable polyester oligomer(s) may contain, if desired, a proportion of carbonylamino (i.e. —C(=O)—NH—) linking groups by including an appropriate amino functional reactant as part of the "hydroxyl component" or alternatively all of the hydroxyl component may comprise amino functional reactants, thus resulting in a polyamide oligomer; such amide linkages are in fact useful in that they are more hydrolysis resistant).

There are many examples of carboxylic acids (or their ester forming derivatives) which can be used in crosslinkable polyester oligomer(s) synthesis for the provision of the monomer(s) providing an acid component. Examples include, but are not limited to $C_2$ to $C_{22}$ monocarboxylic acids such as (alkylated) benzoic acid and hexanoic acid; and $C_4$ to $C_{20}$ aliphatic, alicyclic and aromatic dicarboxylic acids (or higher functionality acids) or their ester-forming derivatives (such as anhydrides, acid chlorides, or lower alkyl esters). Specific examples include adipic acid, fumaric acid, maleic acid, succinic acid, itaconic acid, azelaic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, fatty acid dimers, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Similarly there are many examples of polyols which may be used in crosslinkable polyester oligomer(s) synthesis for the provision of the monomer(s) providing a hydroxyl component. The polyol(s) preferably have from 1 to 6, more preferably 2 to 4 hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane and 1,1,1-tris(hydroxymethyl)ethane (TME).

The crosslinker groups may be introduced into the polyester oligomer(s) using two general methods: i) by utilising in the polymerisation process to form a polyester oligomer(s) a monomer(s) carrying a crosslinker group; or ii) utilising a monomer(s) bearing a reactive group which may be reacted with a compound carrying a crosslinker group and a corresponding reactive group.

Suitable compounds bearing non-ionic water dispersing groups include for example ethylene oxide-containing hydroxy functional compounds such as alkoxypolyethylene glycols and polyethylene glycols. Preferably the ionic water-dispersing groups are carboxylic acid groups, sulphonic acid groups or sulphonate anion groups. Preferably incorporation of carboxylic acid groups can occur by having a residual carboxylic acid functionality, post functionalisation of a hydroxy-functionalised polyester oligomer(s) or use of sterically hindered hydroxy functional acids such as dimethylolpropionic acid. Examples of suitable compounds are the alkali metal salts of sulphonic acid substituted aromatic dicarboxylic acids, for example alkali metal salts of 5-sulpho-1,3-benzene dicarboxylic acid. Particularly preferred is sodio-5-sulphoisophthalic acid (SSIPA).

Preferably the ionic sulphonate water-dispersing group content of the crosslinkable polyester oligomer(s) is in the range of from 7.5 to 100 milliequivalents of ionic water-dispersing groups per 100 g of crosslinkable polyester oligomer(s), more preferably from 10 to 75 milliequivalents per 100 g.

Preferably the acid value of the crosslinkable polyester oligomer(s) is in the range of from 3 to 25 mgKOH/g.

Preferably the crosslinkable polyester oligomer(s) has a polyethylene oxide content of 5 to 25% by weight.

The esterification polymerisation processes for making the crosslinkable polyester oligomer(s) for use in the invention composition are well known in the art and need not be described here in detail. Suffice to say that they are normally carried out in the melt using catalysts such as tin-based catalysts and with the provision for removing any water (or alcohol) formed from the condensation reaction. A solidified melt is preferably in a form such as flake or ground solid.

The crosslinkable polyester oligomer(s) may be dispersed in water using techniques well known in the art. An aqueous dispersion of the crosslinkable polyester oligomer(s) may be readily prepared by adding water directly to the hot crosslinkable polyester oligomer(s) melt, by adding an aqueous predispersion (or organic solvent solution) of the polyester oligomer(s) to the water phase, or by dispersion of the solidified melt from the condensation polymerisation directly into water.

The crosslinkable, water-dispersible oligomer(s) if a vinyl oligomer(s) is usually derived from free radically polymerisable olefinically unsaturated monomer(s), which are also known as vinyl monomer(s) and can contain polymerised units of a wide range of such monomers, especially those commonly used to make binders for the coatings industry. By a vinyl oligomer herein is meant a homo- or co-oligomer of one or more vinyl monomers.

The hydrophilic water-dispersing groups may be introduced by for example i) utilising in the synthesis of the crosslinkable vinyl oligomer(s) a vinyl monomer which carries a hydrophilic water-dispersing group (for example an olefinically unsaturated monocarboxylic, sulphonic and/or dicarboxylic acid, such as acrylic acid, methacrylic acid, β-carboxy ethylacrylate, fumaric acid or itaconic acid, an amide such as (meth)acrylamide, or a polyethyleneoxide containing (meth)acrylate monomer such as methoxy(polyethyleneoxide(meth)acrylate) or a hydroxyalkyl(meth)acrylate like hydroxyethyl(meth)acrylate HE(M)A, or alternatively ii) utilising a precursor vinyl oligomer bearing reactive groups which is subsequently reacted with a compound carrying a water-dispersing group.

The crosslinker groups may be introduced into a vinyl oligomer using two general methods: i) by utilising a vinyl comonomer(s) which carries a crosslinker group; or ii) utilising a precursor vinyl oligomer selected reactive groups and which precursor oligomer is subsequently reacted with a compound carrying a crosslinker group. An example of i) is the preparation of an adduct of GMA (glycidylmethacrylate) and an unsaturated fatty acid to form a methacrylate bearing an unsaturated fatty acid residue as a crosslinker group, and then using this as a comonomer in the polymerisation synthesis of the crosslinkable vinyl oligomer. An example of ii) is the initial formation of a precursor vinyl is oligomer bearing epoxide groups by employing GMA as a comonomer in the synthesis of the precursor oligomer and then reacting this with an unsaturated fatty acid whereby the acid and epoxide groups react to attach the unsaturated fatty acid residue crosslinker group by covalent bonding.

Examples of vinyl monomers which may be used to form a crosslinkable vinyl oligomer include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $CH_2=CR^1COOR^2$ wherein $R^1$ is H or methyl and $R^2$ is optionally substituted alkyl or cycloalkyl of 1 to 20 carbon atoms (more preferably 1 to 8 carbon atoms) examples of which are methyl (meth)acrylate, ethyl(meth)acrylate, n-butyl(meth)acrylate, 2-ethylhexyl (meth)acrylate, isopropyl(meth)acrylate, n-propyl(meth)acrylate, and hydroxyalkyl (meth)acrylates such as hydroxyethyl(meth)acrylate, 2-hydroxypropyl(meth)acrylate, 4-hydroxybutyl(meth)acrylate and their modified analogues like Tone M-100 (Tone is a trademark of Union Carbide Corporation).

Particularly preferred is a crosslinkable water-dispersible vinyl oligomer(s) made from a monomer system comprising at least 40 wt % of one or more monomers of the formula $CH_2=CR^1COOR^2$ as defined above. Such a preferred crosslinkable vinyl oligomer is defined herein as a crosslinkable acrylic oligomer. More preferably, the monomer system contains at least 50 wt % of such monomers, and particularly at least 60 wt %. The other monomer(s) in such acrylic oligomer(s) (if used) may include one or more of the other vinyl monomers mentioned above, and/or may include ones different to such other monomers. Particularly preferred monomers include butyl(meth)acrylate (all isomers), methyl(meth)acrylate, ethyl hexyl(meth)acrylate, esters of (meth)acrylic acid, acrylonitrile, vinyl acetate and styrene.

The crosslinkable vinyl oligomer(s) is preferably prepared by free radical polymerisation, although in some circumstances anionic polymerisation may be utilised. The free radical polymerisation can be performed by techniques known in the art, for example by emulsion polymerisation, solution polymerisation, suspension polymerisation or bulk polymerisation.

A free-radical polymerisation of vinyl monomer(s) to form a crosslinkable vinyl oligomer(s) will require the use of a free-radical-yielding initiator(s) to initiate the vinyl monomer polymerisation. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Azo compounds such as azoisobutyronitrile may also be used. Metal compounds such Fe.EDTA (EDTA is ethylene diamine tetracetic acid) may also be usefully employed as part of the redox initiator system. It is possible to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range of from 0.05 to 6 wt % based on the total vinyl monomer(s) weight used.

It may be desirable to control the molecular weight of the vinyl oligomer(s) by addition of a chain transfer agent to the free radical polymerisation process. Conventional chain transfer agents may be utilised and include mercaptans, sulphides, disulphides, triethylamine and halocarbons. In particular however the technique known as catalytic chain transfer polymerisation (CCTP) may be used to provide low molecular weights. In this case a free radical polymerisation is carried out using a free radical forming initiator and a catalytic amount of a selected transition metal complex acting as a catalytic chain transfer agent (CCTA), and in particular a selected cobalt chelate complex. Such a technique has been described for example in N. S. Enikolopyan et al, J.Polym.Chem.Ed., Vol 19, 879 (1981), U.S. Pat. Nos. 4,526, 945, 4,680,354, EP 0196783 A1, EP 0199436 A1, EP 0788518 A1 and WO 87/03605.

The use of catalytic chain transfer agents provide important benefits such as such
 a) very low concentrations of catalytic chain transfer agent (typically 1 to 1000 ppm by weight of vinyl monomer used) are required to attain the preferred low molecular weight oligomer and which do not have the odour often associated with conventional chain transfer agents; and b) CCTP allows the preparation of a vinyl oligomer(s) which has a narrower PDi than is achievable by the use of conventional chain transfer agents for low Mw oligomer(s). As discussed above, low PDI favours low viscosity in the bulk and in solution (for a given Mw), which in turn leads to longer open time.

The crosslinkable water-dispersible vinyl oligomer(s) of the composition of the invention preferably has an acid value in the range of from 5 to 15 mg KOH/g.

The crosslinkable water-dispersible oligomer(s) if a hyperbranched oligomer may be prepared by controlled step-growth (condensation) polymerisation and uncontrolled chain-growth (addition) polymerisation. Methods for preparing hyperbranched or dendritic oligomers are known in the art and are described in for example in Tomalia et al (Angewandte Chemie International Edition English, 1990, Vol 29, pp 138-175) and the Encyclopaedia of Polymer Science and Engineering, Volume Index 1990, pp 46-92. Methods for preparing hyperbranched oligomer(s) are also reviewed in U.S. Pat. Nos. 5,418,301, 5,663,247, WO 96/19537, WO 96/13558, U.S. Pat. Nos. 5,270,402, 5,136,014, 5,183,862, WO 93/18079, U.S. Pat. Nos. 5,266,106 and 5,834,118 and these methods are included herein by reference.

The crosslinkable hyperbranched oligomer(s) are often derived from a nucleus (or core molecule) having one or more reactive groups to which successive groups of branching and/or chain extender molecules having at least two reactive groups are added to form branches. Each successive group of branching and/or chain extender molecules is normally known as a generation. The branches may then be chain terminated by adding a chain terminator molecule(s) having one reactive group that is reactive towards a reactive group on the branch. Alternatively the branches can be made first and linked together afterwards to give the hyperbranched oligomer(s).

The size, shape (for example spheroid-, comb- cylindrical- or ellipsoid-shaped) and properties of hyperbranched oligomer(s) can be controlled by the choice of the core molecule, the number of generations, the degree of branching and the choice and amount of chain extender and chain terminator molecules employed.

Examples of core molecules include but are not limited to molecules having one or more carboxylic acid groups (including monofunctional carboxylic acids having at least two hydroxyl groups such as dimethylolpropionic acid), amine groups (including ammonia, polyfunctional amines, such as ethylene diamine, linear and/or branched polyethyleneimines), halide groups, hydroxyl groups (including mono- and polyfunctional alcohols such as pentaerythritol, dipentaerythritol, alkyl glucosides, neopentyl glycol, tris(hydroxymethyl)ethane, trimethylolpropane (TMP), bis-TMP, sorbitol, mannitol, sacharides, sugar alcohols, 1,1,1-tris-(4'-hydroxyphenyl)-ethane, 3,5-dihydroxy-benzyl alcohol) or epoxide groups.

Examples of chain extender molecules include but are not limited to diisocyanates, diethylene diimine, diols, and carboxylic anhydrides. Examples of branching molecules include but are not limited to, for example, 3,5-dihydroxy-benzyl alcohol; monofunctional carboxylic acids having at least two hydroxyl groups, such as dimethylolpropionic acid, and dimethylolbutanoic acid, hydroxy functional diacids (or their esters) such as aspartate esters, 5-hydroxy-isophthalic acid, but may also be indirectly obtained, for example through two Michael additions of an acrylate ester or acrylonitrile to one primary amine functional group, or through reaction of a carboxylic acid functional anhydride such as trimellitic anhydride (TMA) with an OH functional group, which results in a diacid functional group.

Examples of chain terminator molecules include but are not limited to mono-functional molecules (or oligomers) carrying for example epoxide, isocyanate, hydroxyl, thiol, carboxylate, carboxylic anhydride, ester, amides, phosphates, amino, sulphonate and carboxylic acid groups (such as benzoic acid and (meth)acrylic acid, which react with the reactive groups on the periphery of the hyperbranched oligomer(s).

Suitable reactive groups of the molecules used in the preparation of hyperbranched oligomer(s) usually include but are not limited to hydroxyl, carboxylic acid, epoxide, amine, allyl, acryloyl, carboxylic esters, carboxylic anhydrides, silanes, nitriles (which after reduction give amines) and oxazolines.

The crosslinker and/or hydrophilic water-dispersing groups may be introduced into the hyperbranched oligomer(s) using two general methods: i) by utilising in the polymerisation process to form a hyperbranched oligomer(s), a branching molecule, a chain extender molecule and/or chain terminator molecule carrying a crosslinker group and/or hydrophilic water-dispersing groups; or ii) utilising a compound bearing selected reactive groups and which compound is subsequently reacted with a compound carrying a crosslinker group and/or hydrophilic water-dispersing groups.

Preferably the crosslinkable hyperbranched oligomer(s) has a polyethylene oxide content of 7 to 38% by weight and more preferably 12 to 35% by weight.

The aqueous composition of the invention also includes a polymer(s) dispersed therein which is not a crosslinkable water-dispersible oligomer(s) and preferably has a measured weight average molecular weight $\geq$110,000 Daltons, herein termed a "dispersed polymer" for convenience.

Preferably the measured weight average molecular weight (Mw) of the dispersed polymer(s) in the aqueous polymer dispersion is in the range of from 110,000 to 6,000,000, more preferably in the range of from 150,000 to 2,000,000 and especially in the range of from 250,000 to 1,500,000 Daltons. If the dispersed polymer(s) is fully precrosslinked its Mw will be infinite. Also, in some cases, the synthesis to form the crosslinkable oligomer(s) yields, in addition to the low molecular weight oligomer, an amount of very high molecular weight material. For the purposes of this invention, such very high molecular weight material, produced in-situ, is to be considered as a dispersed polymer.

The Mw of the dispersed polymer(s) may be <110,000 Daltons with the proviso that it is non-crosslinkable.

The dispersed polymer(s) may for example be a vinyl polymer, polyurethane, polyester, polyether, polyamide, polyepoxide or a mixture thereof. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer. Blends of dispersed polymers may of course also be used. The dispersed polymer(s) may be prepared as described above for the crosslinkable oligomer(s).

The dispersed polymer(s) may be film forming or non-film forming at ambient temperature.

Preferably the dispersed polymer(s) has a measured Tg (using DSC) which is preferably in the range of from −50 to 300° C., and more preferably in the range of from 25 to 200°

C. and especially in the range of from 35 to 125° C. If the dispersed polymer(s) is a vinyl polymer, the vinyl polymer may be a sequential polymer, i.e. the vinyl polymer will have more than one Tg. Especially preferred is a vinyl polymer which has 10 to 50 wt % of a soft part with a measured Tg in the range of from −30 to 20° C. and 50 to 90 wt % of a hard part of with a measured Tg in the range of from 60 to 110° C. This combination provides an additional advantage of improved block resistance of the resultant coating, especially when co-solvent levels of 0 to 15 wt %, more preferably 0 to 5 wt % and most preferably 0 to 3 wt % of the aqueous composition are used. Blocking is the well-known phenomenon of coated substrates which are in contact tending to unacceptably adhere to each other, for examples doors and windows in their respective frames, particularly when under pressure, as for example in stacked panels.

Preferably the dispersed polymer(s) has an average particle size in the range of from 25 to 1000 nm, more preferably 50 to 600 nm, more preferably 100 to 500 nm and especially in the range of from 150 to 450 nm. The dispersed polymer(s) may also have a polymodal particle size distribution.

Preferably the aqueous composition of the invention comprises 7 to 40 wt % and more preferably 10 to 30 wt % of a dispersed polymer(s).

The dispersed polymer(s) may optionally contain acid groups. The preferred acid value of the dispersed polymer(s) depends on the type and molecular weight of crosslinkable oligomer(s) and (if present) the type of co-solvent used. If the crosslinkable oligomer(s) is hydrophilic, the co-solvent (if used) is preferably also of a hydrophilic nature and a low acid value of the dispersed polymer(s) is preferred (preferably below 40, more preferably below 30, especially below 24, more especially below 19 and most especially below 15 mg KOH/g). If however a hydrophobic crosslinkable oligomer is used, for instance without dispersing groups, the co-solvent is preferentially of a hydrophobic nature (if at all present) and therefore much higher acid values (up to an acid value of 160, more preferably up to an acid value of 125, most preferably up to an acid value of 100 mg KOH/g) of the dispersed polymer(s) may be tolerated to give the desired properties.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 wt %, more preferably below 0.5 wt % and most preferably below 0.2 wt % based on the weight of the vinyl polymer.

The dispersed polymer(s) may optionally contain amide groups (such groups being e.g. obtainable from amide functional monomers such as (meth)acrylamide). If the dispersed polymer(s) is a vinyl polymer comprising polymerised (meth)acrylamide monomers, then preferably the amide group content in the vinyl polymer is below 3.0 wt %, more preferably below 1.5 wt % and most preferably below 0.6 wt % based on the weight of the vinyl polymer.

The dispersed polymer(s) may optionally contain wet-adhesion promoting groups such as acetoacetoxy groups, (optionally substituted) amine or urea groups, for example cyclic ureido groups, imidazole groups, pyridine groups, hydrazide or semicarbazide groups.

The dispersed polymer(s) may optionally contain crosslinker groups which allow crosslinking of the dispersed polymer(s), thus speeding up the drying rate and improving the properties of the final coating (e.g. chemical resistance and scratch resistance).

Preferably a significant part of any crosslinking reaction only takes place after application of the aqueous coating composition to a substrate, to avoid an excessive molecular weight build up in the invention composition prior to such application (by precrosslinking) which may lead to impaired film formation and a decrease in water-resistance.

In an embodiment of the invention the dispersed polymer(s) may be fully or partially pre-crosslinked while present in the aqueous coating composition of the invention and prior to applying a coating. Preferably the dispersed polymer(s) is partially pre-crosslinked. If the dispersed polymer(s) is a dispersed vinyl polymer(s) pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate. Allyl methacrylate is most preferred. Alternatively very low levels of initiator may be used, leading to chain-transfer to the dispersed vinyl polymer(s) and hence to grafting and high Mw. Other ways to generate pre-crosslinking in a dispersed vinyl polymer(s) is to include the use of monomer(s) bearing groups which may react with each other during synthesis to effect pre-crosslinking for example glycidylmethacrylate and acrylic acid.

Particularly preferred dispersed vinyl polymer(s) are acrylic polymer(s) prepared from acrylic monomers as described above.

In a preferred embodiment the dispersed polymer(s) is a vinyl polymer(s) which comprises:
  I. 15 to 80 wt % of styrene and/or α-methylstyrene;
  II. 0 to 50 wt % of one or more of methyl (meth)acrylate, ethyl (meth)acrylate, cyclohexyl (meth)acrylate and n-butyl (meth)acrylate;
  III. 0 to 7 wt %, more preferably 0 to 3.5 wt %, of a vinyl monomer(s) containing a carboxylic acid group(s);
  IV. 0 to 10 wt %, more preferably 0 to 5 wt % of a vinyl monomer(s) containing a non-ionic water-dispersing group(s);
  V. 5 to 40 wt % of a vinyl monomer(s) other than as in I to IV, VI and VII;
  VI. 0 to 5 wt % of a vinyl monomer(s) containing wet adhesion promoter or crosslinker groups (excluding any within the scope of III and VII); and
  VII. 0 to 8 wt %, more preferably 0 to 4 wt %, and most preferably 0.5 to 3 wt % of a polyethylenically unsaturated vinyl monomer, wherein I)+II) add up to at least 50% and I+II+III+IV+V+VI+VII add up to 100%.

Methods for preparing aqueous dispersed polymer(s) are reviewed in the Journal of Coating Technology, volume 66, number 839, pages 89-105 (1995) and Emulsion Polymerisation and Emulsion Polymers, P. Lovell, M. S. El-Aasser, John Wiley, 1997 and these methods are included herein by reference. Any published variant of the emulsion polymerisation process may be utilised to prepare the dispersed polymer(s), including the use of seeded emulsion polymerisation techniques to control particle size and particle size distribution, sequential polymerisation and power feed technique (chapter 23 in "Emulsion Polymers and Emulsion Polymerisation" D R Basset and A E Hamielec, ACS *Symposium Series No* 165, 1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the dispersed polymer(s) is adequate to withstand any destabilising influences of these components. Colloid stability may be achieved by the addition of surfactants at any stage during the preparation of the aqueous composition of the invention. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (M J Schick, M Dekker Inc. 1987), "Polymer Colloids" (Buscall, Corner & Stageman, Elsevier Applied Science Publishers 1985), (DH Craig, Journal of Coatings Technology 61, no. 779, 48,1989) and EP 0317258.

The combination of crosslinkable oligomer(s) and dispersed polymer(s) is most conveniently prepared by physically blending the corresponding aqueous dispersions. An alternative method is to prepare the crosslinkable oligomer(s) in organic solvent solution and to disperse this solution directly into an aqueous dispersed polymer(s). Another method is to introduce the crosslinkable oligomer(s) into an aqueous free radical polymerisation reaction which is used to produce the dispersed polymer(s).

The crosslinkable oligomer(s) may also be diluted with reactive diluent (for example vinyl monomers) at any stage of its preparation and then dispersed in water containing a dispersed polymer(s), followed by polymerisation of the reactive diluent in the presence of the crosslinkable oligomer(s) and the dispersed polymer(s). Optionally, depending on the nature of the reactive diluent, no further polymerisation of the reactive diluent prior to use in a coating may be required.

Alternatively the crosslinkable oligomer(s) and dispersed polymer(s) may be combined by preparing a redispersible dry powder form of the dispersed polymer(s), and then dispersing the redispersible dry powder directly into an aqueous dispersion of the crosslinkable oligomer(s). Methods for preparing redispersible dry powders from polymer emulsions are described for example in U.S. Pat. No. 5,962,554, DE 3323804 and EP 0398576.

In a preferred embodiment of the invention the crosslinkable oligomer(s) and the dispersed polymer(s) are compatible in the drying aqueous composition. Preferably the crosslinkable oligomer(s) and the dispersed polymer(s) give clear films upon film formation after coating of the aqueous composition onto a substrate.

Preferably the ratios by weight of solid material of crosslinkable water-dispersible oligomer(s) to dispersed polymer(s) are in the range of from 10:90 to 50:50, more preferably in the range of from 15:85 to 40:60, still more preferably in the range of from 20:80 to 35:65.

Preferably the aqueous composition of the invention comprises 3 to 68 wt %, more preferably 3 to 60 wt %, most preferably 20 to 57 wt % and especially 45 to 55 wt % of a pigment(s) with an oil absorption number $\leq 25$ g oil/100 g pigment.

Preferably the oil absorption number of the pigment(s) is $\leq 20$ g oil, more preferably $\leq 18$ g oil and most preferably $\leq 16$ g oil/100 g pigment. The oil absorption number is determined by the palette knife method ISO 787, part 5. The pigment(s) may be any pigment known in the art and is preferably an inorganic pigment. Examples of inorganic pigments include but are not limited to metallic oxides such as titanium dioxides, zinc oxides, iron oxides, cobalt oxides and chromium oxides; metal powder suspensions such as gold and aluminium; earth colours such as siennas, ochres and umbers; and lead chromates. The most preferred inorganic pigment is titanium dioxide (rutile).

Organic pigments include mineral pigments such as carbon black.

The physical characteristics of pigments such as their oil absorption number have been found to influence the rheology. Other characteristics include the water absorption number. Preferably the pigment(s) has a water absorption number $\leq 40$ cm$^3$, more preferably $\leq 35$ cm$^3$, most preferably $\leq 30$ cm$^3$ and especially $\leq 28$ cm$^3$ per 100 g of pigment, when measured using the procedure given below.

The oil and water absorption numbers may be influenced by the particle size and any surface treatment of pigments.

The pigment volume concentration (PVC) as defined below of the aqueous coating composition of the invention is preferably in the range of from 1 to 48%, more preferably 1 to 36%, most preferably 2 to 26%, especially 5 to 24% and most especially 17 to 23%.

The composition of the invention may also comprise pigment dispersants. Pigment dispersants may affect the oil and water absorption properties of the pigments as well as influencing any oligomer pigment interactions. Examples of pigment dispersants include but are not limited to the Disperbyk™ range from Byk Chemistry such as Disperbyk™ 181, Disperbyk™ 190; Lactimon™ WS, the Borchi Gen™ range from Borchers such as Borchi Gen™ NA 20; the Dispers™ range from Tego such as Dispers™ 715W, EFKA-1101-1503, EFKA-5010-5244, EFKA-4008-4800; the Nuosperse™ range from Sasol; soya lecithine; Triton™ 165 and Triton™ 405X from Dow Chemical; the Orotan™ range from Rohm & Haas, such as Orotan™ 731SD, Orotan™ 1124; the Solsperse™ range from Avecia Additives, such as Solsperse™ 20000, Solsperse™ 27000; Pigmentverteiler A from BASF; Hydropalat™ 1706 from Cognis; and Coatex™ A122 from Coatex.

The pigment dispersants if present preferably have a Mw $\geq 3000$, more preferably $\geq 5000$ Daltons.

The pigment dispersants if present, preferably comprise 0.1 to 10 wt %, more preferably 0.2 to 5 wt % of the aqueous composition of the invention.

Ranges of thickeners are available for aqueous coating compositions. Newtonian thickeners are defined as thickeners that have a viscosity that is independent of the shear rate. Examples of Newtonian thickeners include but are not limited to Acrysolr™ RM 1020 and Acrysol™ RM 2020 (Rohm & Haas); and Nuvis™ FX 1070 (Sasol Servo).

Thickeners that exhibit a reduced viscosity as shear increases are known as pseudoplastic or shear thinning thickeners. Thickeners that exhibit an increase in viscosity as shear increases are known as shear thickening thickeners. Thixotropic thickeners are shear thinning, however when the shear stress is removed the initial viscosity is only restored over a period of time. Examples of thixotropic thickeners include but are not limited to Acrysol™ TT 935 (Rohm & Haas); Rheo™ 3000 and Thixol™ 53L (Coatex); and Viscalex™ VG2 (Ciba Specialty Chemicals).

The viscosity-shear behaviour of these thickeners is described in "a Handbook of Elementary Rheology" by Howard A. Barnes (ISBN 0-9538032-O-1), Chapter 5, 19-24 and Chapter 15.8, 131; in "Paint, Flow and Pigment dispersions" by Temple C. Patton, John Wiley & Sons (ISBN 0-471-03272-7), Chapter 1, 2-9; and in "Additives for Coatings", Johan Bieleman, Wiley-VCH (ISBN 3-527-29785-5), Chapter 3, 11-13.

It is also possible to classify thickeners as associative and non-associative thickeners. Non-associative thickeners increase the overall viscosity of the continuous phase of the composition. Examples of non-associative thickeners include cellulose derivatives such as cellulose ethers; hydrophobically modified hydroxy ethyl celluloses (HMHEC) and water-soluble polymers such as polyethylene oxides, polyvinyl alcohols, polyacrylamides and polyethyleneoxide based polyurethanes.

Associative thickeners reduce the level of shear thinning. Examples of associative thickeners include water soluble polymers, in particular hydrophobe modified water soluble polymers such as hydrophobically modified ethylene oxide urethane block copolymers (HEUR) and hydrophobically modified alkali soluble emulsions (HASE).

HEUR's and HMHEC's tend to be mainly non-ionic and HASE's tend to be anionic in nature.

Coatings and rheology properties are reviewed in Organic Coatings, Science and Technology, Vol 2, Chapter 19 and 35, Z. W Wicks, F. N. Jones, S. P. Pappas, John Wiley & Sons ISBN 0-471-59893-3(v 2).

Newtonian-like behaviour of the composition of the invention is beneficial for open time and although real Newtonian behaviour is preferred, a limited degree of pseudoplastic behaviour is acceptable within specified ranges.

Newtonian-like thickeners are defined as thickeners that when added to a standard formulation as is described below for Example 1; with identical amounts of components 1 to 7; in an amount to give a viscosity of 1,000 to 5,000 mPa·s (measured with a Brookfield DV-11$^+$ viscometer, spindle #4, at 6 rpm and at 23+/−2° C.), have a shear ratio in the range of from 1 to 20, more preferably in the range of from 1 to 15 and most preferably in the range of from 1 to 10, where the shear ratio is defined as the ratio of the measured viscosities of the formulation at a shear rate of $10\ s^{-1}$ and at $1,000\ s^{-1}$, more preferably at a shear rate of $10\ s^{-1}$ and at $5,000\ s^{-1}$, and most preferably at a shear rate of $10\ s^{-1}$ and at $10,000\ s^{-1}$ (measured with a TA Instruments AR 2000N Rheometer).

The thickener(s) for use in the invention composition preferably comprises a Newtonian-like thickener(s), optionally in combination with a thixotropic thickener(s). The term Newtonian-like herein includes Newtonian.

In an embodiment of the invention the aqueous composition preferably comprises 0.1 to 10 wt %, more preferably 0.2 to 8 wt % and most preferably 0.3 to 6 wt % and especially 0.5 to 4 wt % of a Newtonian-like thickener(s).

In another embodiment of the invention the aqueous composition preferably comprises 0.1 to 10 wt %, more preferably 0.2 to 8 wt %, most preferably 0.3 to 6 wt % and especially 0.5 to 4 wt % of a thixotropic thickener(s).

More preferably the composition of the invention comprises a combination of a Newtonian-like and a thixotropic thickener(s) in a ratio in the range of from 95:5 to 30:70, more preferably 90:10 to 50:50.

Most preferably the composition of the invention has a Newtonian-like behaviour and this is defined as the composition of the invention having a shear ratio in the range of from 1 to 20, more preferably in the range of from 1 to 15 and most preferably in the range of from 1 to 10, where the shear ratio is defined as the ratio of the measured viscosities of the composition at a shear rate of $10\ s^{-1}$ and at $1,000\ s^{-1}$, more preferably at a shear rate of $10\ s^{-1}$ and at $5,000\ s^{-1}$, and most preferably at a shear rate of $10\ s^{-1}$ and at $10,000\ s^{-1}$ (measured with a TA Instruments AR 2000N Rheometer).

The composition of the invention may also comprise 0.01 to 1 wt %, more preferably 0.02 to 0.5 wt % of levelling agents and/or flow additives such as polyacrylate levelling additives; cellulose acetobutyrate; silicones and fluorosurfactants such as the Fluowet™ range.

A co-solvent, as is well known in the coating art, is an organic solvent employed in an aqueous composition to control and steer the drying characteristics and to improve the film forming process thereof. The invention composition can contain a single co-solvent or a mixture of co-solvents. More preferably the invention composition contains co-solvent or a mixture of co-solvents in a concentration ≦10%, more preferably ≦5%, most preferably ≦3% and most especially 0% by weight based on the invention composition. Preferably the co-solvent has a molecular weight below 200 g/mol. The co-solvent may be organic solvent incorporated or used during preparation of the crosslinkable oligomer(s) and/or the dispersed polymer(s) or may have been added during formulation of the aqueous composition.

An advantage of the present invention is that (if used) co-solvent can; if as is often required for environmental and safety reasons, be present at very low concentrations because of the plasticising nature of the crosslinkable oligomer(s). Preferably the co-solvent to water ratio is below 0.8, more preferably below 0.4, most preferably below 0.2 and especially below 0.1. An important consideration when choosing a co-solvent is whether or not the co-solvent is compatible with the crosslinkable oligomer(s) and/or the dispersed polymer(s) and the effect of any co-solvent partitioning (and the partitioning of the co-solvent in the (aqueous) oligomer phase versus the dispersed polymer particles is preferably >1/1, more preferably >2/1 and most preferably >3/1). If the co-solvent is more compatible with the dispersed polymer(s) it will swell the dispersed polymer, thus increasing the overall viscosity. Preferably any co-solvent present in the aqueous composition of the invention is more compatible with the crosslinkable oligomer(s) than with the dispersed polymer(s), so that the dispersed polymer(s) undergoes little if any swelling by the co-solvent.

The drying process of an applied invention composition can be divided in four stages namely the periods of time necessary to achieve respectively, dust-free, tack-free, thumb-hard and sandable coatings using the tests described herein.

Preferably the dust-free time is ≦5 hours, more preferably ≦2 hours and still more preferably ≦50 minutes.

Preferably the tack-free time is ≦20 hours, more preferably ≦12 hours, still more preferably ≦9 hours and most preferably ≦8 hours.

Preferably the thumb-hard time is ≦48 hours, more preferably ≦24 hours, more preferably less than 16 hours, especially ≦12 hours and most especially ≦10 hours.

Preferably the resultant coating is sandable within 72 hours, more preferably within 48 hours, still more preferably within 24 hours and especially within 16 hours.

The equilibrium viscosity of the aqueous coating composition is a suitable method for illustrating the drying characteristics of the aqueous coating composition. By the equilibrium viscosity of an aqueous composition at a particular shear rate and solids content is meant the viscosity measured when the aqueous composition has been subjected to the particular shear rate for long enough to ensure that the viscosity measurement has reached a constant value.

If the composition is to remain brushable and workable during drying, it is necessary that its equilibrium viscosity does not exceed defined limits during the drying process and hence over a range of solids contents. Accordingly the crosslinkable water-dispersible oligomer(s) which are used in this invention do not give a significant phase inversion viscosity peak, if any at all, during the drying process when the system inverts from one in which water is the continuous phase to one in which the continuous phase is a mixture of crosslinkable water-dispersible oligomer(s), solvent and optionally (part of is the) water.

Preferably, the composition of the invention has an equilibrium viscosity ≦500 Pa·s, during the first 10 minutes, more preferably during the first 13 minutes, most preferably during the first 17 minutes and especially during the first 21 minutes of drying when measured using any shear rate in the range of from 0.01+/−0.005 to 900+/−5 s−1 and at 23+/−2° C.

More preferably, the composition of the invention has an equilibrium viscosity of ≦400 Pa·s, more preferably ≦200 Pa·s and especially ≦100 Pa·s when measured as defined above.

More preferably the equilibrium viscosity is measured using any shear rate in the range of from 0.1+/−0.05 to 100+/−5 s$^{-1}$ and at 23+/−2° C.

Preferably the solids content of the aqueous coating composition when determining the equilibrium viscosity is in the range of from 20 to 50%, more preferably in the range of from 20 to 55%, and especially in the range of from 20 to 60% by weight of the composition.

The aqueous coating composition of the invention may be applied to a variety of substrates including wood, board, metal, stone, concrete, glass, cloth, leather, paper, plastic, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating.

Accordingly, in a further embodiment of the invention there is provided a coating obtainable from an aqueous coating composition of the present invention.

In another embodiment of the present invention there is provided a substrate coated with an aqueous coating composition of the present invention.

In yet another embodiment of the invention there is provided a method for coating a substrate using an aqueous coating composition of the present invention.

The aqueous coating composition of the invention may contain other conventional ingredients, some of which have been mentioned above; examples include pigments, dyes, extenders such as barium sulphate, (tertiary) amines, waxes, polyphosphate salts, emulsifiers, surfactants, plasticisers, thickeners (including non-Newtonian or non-thixotropic thickeners), heat stabilisers, levelling agents, anti-cratering agents, fillers, sedimentation inhibitors, UV absorbers, antioxidants, dispersants, flow agents, adhesion promoters, defoamers, co-solvents, wetting agents; such as may be used in conventional binder systems; and the like introduced at any stage of the production process or subsequently. It is possible to include an amount of antimony oxide in the dispersions to enhance the fire retardant properties. Optionally external crosslinking agent(s) having reactive functional groups as described above may be added to the aqueous composition of the invention In particular, the aqueous coating compositions of the invention, if the dispersed polymer(s) is autoxidisable, advantageously include a drier salt(s). Drier salts are well known to the art for further improving curing in unsaturated film-forming substances. Generally speaking, drier salts are metallic soaps that are salts of metals such as cobalt, manganese, zirconium, lead, neodymium, lanthanum and calcium; and long chain carboxylic acids. The level of drier salt(s) in the composition is typically that to provide an amount of metal(s) within the range of from 0.01 to 0.5% by weight based on the weight of autoxidisable dispersed oligomer(s) and/or polymer(s).

Drier accelerators may be added to the drier salts. Suitable drier accelerators include 2,2'-bipyridyl and 1,10-phenanthroline.

If desired the aqueous dispersion of the invention can be used in combination with other polymer dispersions or solutions, which are not according to the invention.

The present invention is now illustrated by reference to the following examples. Unless otherwise specified, all parts, percentages and ratios are on a weight basis.

Test Methods:

Open Time:

To test for the open time of the aqueous compositions prepared as described in the examples below, the aqueous composition was applied using a brush or a roller to the upper area (approximately 30×60 cm marked out with adhesive tape at the lower area) of a primed wooden panel (50×60 cm) [a non porous medium density fibreboard available from Aartsbouw B V, Waalwijk, The Netherlands] at a wet film thickness of 110 to 130 μm which was checked at random points in the film with a wet film thickness gage. The adhesive tape was removed and the open time was determined after 5 minutes and at intervals of 5 minutes by applying a fresh paint layer of approximately 15×20 cm bordering on the coated area. Subsequently the whole area of approx 50×15 cm was rebrushed with a, dipped in paint, semi-wet brush (Monoblock no 12, pure bristles/polyester 5408-12).

The open time was considered to be over once the composition carried on the brush no longer formed a homogeneous layer with the coating on the substrate with the proviso that the level of resistance that the brush encounters should not increase significantly and that no significant visible differences in flow should occur in the various recoated areas (when compared to the first recoated area). The open time is also considered to be over at the point in time after which one of these conditions is not met.

In this way the approximate time interval for open time was established and this method was then repeated with intervals of 2 minutes to determine the open time more accurately. The measurements were carried out at relative humidity levels of 44+/−2% and temperatures of 23+/−2° C.

Drying Time:

To test the dust-free, tack-free and thumb-hard drying stages of the aqueous compositions prepared in the examples as described below, the aqueous composition was applied to a glass plate at a wet film thickness of 80 μm. Drying time tests were performed at regular time intervals at relative humidity levels of 44+/−2% and temperatures of 23+/−2° C.

Dust-Free Time:

The dust-free time was determined by dropping a piece of cotton wool (about 1 cm$^3$ i.e. 0.1 g) onto the drying film from a distance of 25 cm. If a person could immediately blow the piece of cotton wool from the substrate without leaving any wool or marks in or on the film, the film was considered to be dust-free.

Tack-Free Time:

The tack-free time was determined by placing a piece of cotton wool (about 1 cm$^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Sandability

Sandability corresponds to the hardness of a coating at the point when a coating can be sanded properly. The composition prepared in the examples described below was applied to a piece of wood at a wet film thickness of 120 μm. The coating was abraded by hand with sandpaper (grain delicacy P150) at regular time intervals at relative humidity levels of 50+/−5%, temperatures of 23+/−2° C. and an airflow ≦0.1 m/s. When there was no significant clogging (or the coating started powdering) the coating was considered to be sandable.

Viscosity:

All viscosity measurements were performed on either i) a TA Instruments AR2000N Rheometer, using cone & plate and/or plate & plate geometries, depending on the viscosity of the sample to be measured, (a Peltier heating/cooling unit in the bottom plate was used to control the temperature) or ii) a Brookfield DV-II+ Viscometer, spindle #4.

Equilibrium Viscosity

The equilibrium viscosity measurements were performed with a plate & plate (diameter 15 m, gap 500 μm, at 23+/−2° C.). All compositions were used at the solids level at which they were prepared and not diluted to lower solids levels.

Step 1: Three test charts were provided with coatings of identical film thickness. The coatings were applied with a 120 μm wire rod and the actual film thickness (and its uniformity) was checked with a wet film gauge, 20 to 370 μm, of Braive Instruments. The charts were dried under identical conditions in an environment where the airflow was <0.1 mis.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at representative shear rates, for example at 0.1 $s^{-1}$, 1 $s^{-1}$, 10 $s^{-1}$ and 100 $s^{-1}$. The measurements were continued for 90 minutes, unless reproducible sampling from the test charts could not be performed properly within that period of time (due to for example drying of the film to reach the dust-free time).

Molecular Weight Determination

Gel permeation chromatography (GPC) analyses for the determination of polymer molecular weights were performed on an Alliance Waters 2690 GPC with two consecutive PL-gel columns (type Mixed-C, l/d=300/7.5 mm) using tetrahydrofuran (THF) as the eluent at 1 $cm^3$/min and using an Alliance Waters 2410 refractive index detector. Samples corresponding to about 16 mg of solid material were dissolved in 8 $cm^3$ of THF, and the mixtures were stirred until the samples had dissolved. The samples were left undisturbed for at least 24 hours for complete "uncoiling" and subsequently were filtered (Gelman Acrodisc 13 or 25 mm ø CR PTFE; 0.45 μm) and placed on the auto-sampling unit of the GPC. A set of polystyrene standards (analysed according to DIN 55672) was used to calibrate the GPC.

All species with a molecular weight less than 1000 Daltons are ignored when calculating the Mw and PDi for the crosslinkable oligomers. When Daltons are used in this application to give molecular weight data (g/mole), it should be understood that this is not a true molecular weight, but a molecular weight measured against polystyrene standards as described above.

Water Solubility

The water solubility of crosslinkable oligomer(s) was determined as follows: A sample of a crosslinkable oligomer was dispersed in water and diluted with water/ammonia to 10% solids and the pH adjusted to the desired pH, within a range of from 2 to 10, and the dispersion was then centrifuged over 5 hours at 21000 rpm at 23+/−2° C. on a Sigma 3K30 centrifuge (21,000 rpm corresponds to a centrifugal force of 40,000 g). The pH chosen should be the pH where the crosslinkable oligomer is expected to be most soluble, for example often a pH of about 9 is suitable for anionic stabilised dispersions and a pH of about 2 is often suitable for cationic stabilised dispersions. After centrifugation a sample of the supernatant liquid was taken and evaporated for 1 hour at 150° C. to determine the solids content of the supernatant liquid. The water-solubility percentage was calculated by dividing the amount of solids (g) of the supernatant by the total of amount of solids in the sample and multiplying by 100.

Surface Hardness

König hardness was determined following DIN 53157 NEN5319 using Erichsen hardness measuring equipment. The values are given in seconds and the higher the value is the harder the coating is.

Pigment Water Absorption

The water absorption number of a pigment (for example titanium dioxide) was determined by a method recommended by Tioxide Europe and comprises titration of the pigment with water in the presence of a predetermined amount of Calgon PT in such a way that two separate end points could be distinguished. These were (a) the amount of titrant required to just wet 100 g of pigment and (b) the amount of titrant required to give a fluid dispersion which is the value taken for the water absorption.

The pigment (50+/−0.1 g) was added to a dry 200 $cm^3$ glass jar. A 5% Calgon PT solution (4 $cm^3$, sodium hexamethaphosphate (sodium polyphosphate) or Calgon N tetrapotassiumpyrophosphate; dissolved in 95 grams of water) was pipetted into the jar and about one half of the expected amount of water was also added via a burette. The components were mixed thoroughly for 1 minute. Water was added in 0.2 $cm^3$ increments with thorough mixing for approximately 0.5 minutes between additions. The first end point occurs when the pigment is just wetted, usually with the formation of a large ball of paste and is defined as $cm^3$ of Calgon+[$cm^3$ of water× 2].

(b) The paste ball was then broken down with a spatula and 2 $cm^3$ water was mixed in. Further increments of water (0.5 $cm^3$) were made, reducing to 0.2 $cm^3$ as the second end-point was approached, and the paste was stirred vigorously between additions.

The second and final end-point occurred is taken when a smooth, even line (not a "herring-bone" pattern) was temporarily exposed by drawing the tip of a spatula horizontally over the bottom of the jar immediately after it has been tilted 60° from vertical. The slurry should just flow back over the dry glass thus exposed. The second end-point was defined as: Calgon ($cm^3$)+[water ($cm^3$)×2]

A pigment with a known water absorption should be tested by the same procedure at the same time and the results for the pigment under test reported relative to these results for the standard.

Pigment Oil Absorption

The pigment oil absorption was measured using ISO 787 part 5.

Pigment Volume Concentration

The pigment volume concentration is defined as the solid pigment volume/(solid pigment volume+solid oligomer volume+solid dispersed polymer volume). The volume is equal to mass/density. The density of the crosslinkable water-dispersed oligomer(s) used herein is 1 $gcm^{-3}$. In general, the densities of the crosslinkable oligomer(s) varied between 1 and 1.1 $gcm^{-3}$ and are therefore taken for the purpose of the calculation as 1 $gcm^{-3}$). The density of the dispersed polymer(s) used herein is 1 $gcm^{-3}$. In general, the densities of the dispersed polymer(s) varied between 1 and 1.1 $gcm^{-3}$ and are therefore taken for the purpose of the calculation as 1 $gcm^{-3}$).

| Materials & Abbreviations used: | |
|---|---|
| AMP 95 = | 2-amino-2-methyl-1-propanol, Angus Chemical Company; 95% in water |
| AMP 90 = | 2-amino-2-methyl-1-propanol, Angus Chemical Company; 90% in water |
| Dehydran ™ 1293 = | defoamer available from Cognis, 10% in butyl glycol |
| Surfynol ™ 104E = | wetting agent available from Air Products, 50% in ethylene glycol |
| NeoCryl ™ BT-24 = | pigment dispersant available from NeoResins 100% solid material |
| Disperbyk ™ 190 = | pigment dispersant available from Byk-Chemie 40% in water |
| Tioxide ™ RHD-2 = | titanium dioxide available from Huntsman-Tioxide<br>oil absorption number 18 g/100 g pigment<br>water absorption number 28 $cm^3$/100 g pigment<br>density = 4.05 g $cm^{-3}$ |
| Tioxide ™ TR-50 = | titanium dioxide available from Huntsman-Tioxide<br>oil absorption number 33 g/100 g pigment<br>water absorption number 44 $cm^3$/100 g pigment<br>density = 3.71 g $cm^{-3}$ |
| Kronos ™ 2044 = | titanium dioxide available from Kronos<br>oil absorption number 38 g/100 g pigment<br>water absorption number 47 $cm^3$/100 g pigment<br>density = 3.6 g $cm^{-3}$ |
| Kronos ™ 2190 = | titanium dioxide available from Kronos<br>oil absorption number 18 g/100 g pigment<br>water absorption number 25 $cm^3$/100 g pigment<br>density 4.1 g $cm^{-3}$ |
| Tioxide ™ TR-92 = | titanium dioxide available from Huntsman-Tioxide<br>oil absorption number 18 g/100 g pigment<br>water absorption number 28 $cm^3$/100 g pigment<br>density = 4.05 g $cm^{-3}$ |
| Borchigel ™ L75N = | (1:1) Pseudoplastic thickener available from Borchers (25% in water) |
| Acrysol ™ RM-1020 = | Newtonian-like thickener available from Rohm & Haas, (20% in butyldiglycol/water 12.5/87.5) |
| Rheo ™ 2000 = | Thixotropic thickener available from Coatex (30% in water) |

EXAMPLE 1

Preparation of an Alkyd Polyol Mixture X1

A 2 L round bottom flask, equipped with a stirrer and a thermometer, was loaded with diethanolamine (247.56 g) and sodium methoxide (2.54 g). The mixture was heated to 100° C. until the sodium methoxide was dissolved. Then sunflower oil (1248.08 g) was added giving a hazy reaction mixture. Stirring the hazy reaction mixture at 100 to 110° C. was continued until a clear reaction mixture was obtained and a conversion of at least 85% was achieved, as determined by titration of residual amine functionality in the product with aqueous hydrochloric acid. The resulting mixture was then cooled to 70° C. before adding phosphoric acid (1.81 g) and stirring for 15 minutes. The alkyd polyol mixture (X1) was cooled to room temperature and stored under nitrogen. The conversion was 90.2%.

Preparation of Self-crosslinkable (Autoxidisable) Urethane Oligomer A1, and its Dispersion DA1

A 1 L round bottom flask, equipped with a stirrer and a thermometer, was loaded with dimethylol propionic acid (19.36 g), 1-methyl-2-pyrrolidinone (92.5 g), 1,4-cyclohexane dimethanol (8.97 g), methoxy polyethylene glycol, Mn~750, available from La Porte (18.87 g) and the alkyd polyol mixture X1 (260.43 g) in a nitrogen atmosphere. The reaction mixture was stirred until a clear solution was obtained. At a maximum temperature of 25° C. toluene diisocyanate (99.89 g) was fed into this reaction mixture without exceeding a reactor temperature of 50° C. After this feed was complete, the reaction mixture was heated to 80° C. and stirred at this temperature for 1 hour. The resultant isocyanate free alkyd urethane oligomer was then cooled to about 70° C., and diluted with dipropylene glycol monomethyl ether (Dowanol DPM) (51.38 g). Subsequently N-dimethyl ethanol amine (10.27 g) was added and the mixture was stirred for 15 minutes. Then water (155.43 g) was added and the temperature was lowered to 55 to 60° C. The resultant predispersion was stirred for an additional 15 minutes.

The resultant predispersion (600 g), at 55 to 60° C., was dispersed in water (752.88 g; 45 to 50° C.), over 60 minutes and under a nitrogen atmosphere. After the addition was complete, the final dispersion was stirred for an additional 15 minutes, cooled to ambient temperature, filtered over a 200-mesh sieve and stored under nitrogen. The dispersion DA1 had a solids content of 25 wt % and a pH of 6.9. GPC analysis of A1: Mw=2990; PDi=1.93

Dispersed Vinyl Polymer P1 (NeoCrvyl™ TX200)

NeoCryl™ TX200 is a high molecular weight acrylic emulsion obtainable from Avecia BV, The Netherlands. NeoCryl is a registered trademark of Avecia.

Preparation of a Blend of Oligomer Dispersion DA1 and Dispersed Polymer P1=A1P1

A 500 $cm^3$ round bottom flask, equipped with a stirrer, was loaded with DA1 (171.2 g) in a nitrogen atmosphere, a drier salt Durham™ VX 74 (0.44 g ex Elementis Pigments) was added and subsequently dispersion P1 (155.9 g) was added while stirring the mixture. The blend was stirred for an additional 20 minutes at room temperature. The blend had a solids content of 37.4 wt %, and a pH of 7.6.

Pigmented Paint Compositions Comprising A1P1 with Thickeners and Pigments.

A 500 $cm^3$ jar, equipped with a stirrer, was loaded with the components listed in Table 1 below. Comparative Example 1B is the reference formulation referred to above.

TABLE 1

| | Example 1 | Comparative Example 1A | Comparative Example 1B |
|---|---|---|---|
| Components (g) | | | |
| 1. A1P1 | 65.7 | 65.7 | 65.7 |
| 2. Water | 5.9 | 5.9 | 6.9 |
| 3. AMP 95 | 0.2 | 0.2 | 0.2 |
| 4. Dehydran ™ 1293 | 1.5 | 1.5 | 1.5 |
| 5. Surfynol ™ 104E | 0.4 | 0.4 | 0.4 |
| 6. NeoCryl ™ BT-24 | 3.2 | 3.2 | 3.2 |
| 7. Tioxide ™ RHD-2 | 23.1 | 23.1 | — |
| 8. Tioxide ™ TR-50 | — | — | 22.2 |
| 9. Borchigel ™ L75N | — | 1.7 | 1.4 |
| 10. Acrysol ™ RM-1020 | 5.0 | — | — |
| Pigment Volume Concentration | 17% | 17% | 17.7% |
| Low shear viscosity (mPa · s)[1] 6 rpm | 3300 | 4000 | 4500 |
| Viscosity (Pa · s)[2] at shear rate $10 \, s^{-1}$ | 1.175 | 2.19 | 2.363 |
| Viscosity (Pa · s)[2] at shear rate $10,000 \, s^{-1}$ | 0.314 | 0.0483 | 0.0529 |
| Shear ratio | 3.7 | 45.3 | 44.7 |
| Open time (min) | 19 | 15 | 13 |
| Tack-free time (hrs) | 9 | 11 | 8 |
| Dust-free time (min) | 45 | — | 20 |
| Thumb-hard time (hrs) | 12 | — | 4 |
| König Hardness development | | | |
| 4 hrs 23 +/− 3° C. | 14 | — | 20 |
| 4 days 23 +/− 3° C. | 32 | — | 27 |
| 16 hrs 52° C. | 24 | — | 27 |

[1]Viscosity determined by a Brookfield DV-II+ Viscometer, spindle #4
[2]Viscosity determined by a TA Instruments AR2000N Rheometer The equilibrium viscosity of Example 1 was measured and is given below in Table 2.

TABLE 2

| Time (min) | Calculated solids (%) | Shear rate $0.1 \, s^{-1}$ Viscosity (Pa · s) | Shear rate $1.0 \, s^{-1}$ Viscosity (Pa · s) | Shear rate $10 \, s^{-1}$ Viscosity (Pa · s) | Shear rate $100 \, s^{-1}$ Viscosity (Pa · s) |
|---|---|---|---|---|---|
| 0 | 49.6 | 18.3 | 3.5 | 0.9 | 0.5 |
| 2 | 51.2 | 22.7 | 3.8 | 1.3 | 0.7 |
| 7.5 | 55.5 | 34.6 | 7.9 | 2.5 | 1.2 |
| 13 | 59.8 | 80.1 | 17.8 | 4.9 | 2.4 |
| 18 | 63.8 | 427 | 80.2 | 21.5 | 10.1 |
| 23 | 67.7 | 42000 | 13000 | 1400 | 215 |
| 30 | 73.3 | 13000 | 4000 | 340 | 55 |
| 35 | 77.2 | 270000 | 160000 | 8300 | 1600 |

EXAMPLE 2

Preparation of a Dispersion of a Crosslinkable Vinyl Oligomer DA2

To a round bottomed flask equipped with a condenser, thermometer and mechanical stirrer 890.9 parts of water, and 5.5 parts of Sulfopon™ 101P (ex Surfactant Specialities Private Limited) were charged. This mixture was heated to 80° C. At 80° C. 10% of a monomer feed consisting of 286.9 parts of water, 16.5 parts of Sulfopon™ 101P, 32.9 parts of lauryl mercaptane, 98.8 parts of Bisomer™ MPEG 550MA (ex Laporte Performance Chemicals), 65.9 parts of diacetone acrylamide, 230.5 parts of iso-butyl methacrylate, and 263.4 parts of ethyl methacrylate and 30% of a catalyst feed consisting of 2.0 parts of ammonium persulphate and 96.8 parts of water was added.

5 minutes after the addition of the initial feeds, the remainder of the monomer and the catalyst feed was added over a period of 60 minutes. At the end of the addition of the monomer feed 10.0 parts of water was used to rinse the feed tank which was then added to the reactor. A temperature of 80° C. was maintained for 30 minutes after which 2.1 parts of a 30 wt % mixture of t-butyl hydroperoxide in water and 12.9 parts of a 5 wt % solution of iso-ascorbic acid in water was added. The mixture was kept at 80° C. for another 30 minutes after which the sample was cooled to room temperature. At room temperature 2 parts of Proxel™ Ultra10 (ex Avecia Limited) was added followed by 23.7 parts of adipic dihydrazide.

The resulting emulsion DA2 had a solids content of 35 wt %.

Preparation of the Urethane Acrylate Hybrid Dispersed Polymer P2

Stage 1:

A 1 L round bottom flask, equipped with a stirrer and a thermometer, under a nitrogen atmosphere was loaded with 1-methyl-2-pyrrolidinone (100.00 g), dimethylol propanoic acid (24.00 g), dicyclohexyl methane diisocyanate (Desmodur™ W, from Bayer; 152.68 g) and Priplast™ 3192 (Uniqema; 223.33 g). The reaction mixture was heated to 55° C. The first portion of catalyst (0.05 g tin octoate) was added and the temperature was raised to 90 to 95° C. The mixture was kept at this temperature for 1 hour. The second portion of catalyst (0.05 g tin octoate) was then added and the mixture was kept at 90° C. for an additional hour. The isocyanate concentration of the mixture was found to be 4.68%. The resultant isocyanate terminated urethane prepolymer (490.05 g) was then cooled to 70° C. and neutralised with triethyl amine (17.75 g). Then the reaction mixture was diluted with n-butyl methacrylate (196 g) and the mixture was homogenised for 15 minutes at 65° C.

Stage 2:

A 2 L round bottom flask, equipped with a stirrer and thermometer under a nitrogen atmosphere, was loaded with a water phase consisting of water (1045.77 g) and n-butyl methacrylate (174.00 g). The urethane prepolymer prepared in stage 1 (625 g), (which was kept at 60 to 65° C.), was fed into the water phase over a period of 1 hour, while keeping the temperature of the reactor contents below 30° C. After the prepolymer feed was complete, the mixture was stirred for an additional 5 minutes. Then the urethane dispersion was chain extended by the addition of an aqueous 64.45% hydrazine hydrate solution ($N_2H_4 \cdot H_2O$; 11.23 g in 25.00 g $H_2O$) and the temperature was allowed to drift for 10 minutes. A reactor temperature of 30° C. was reached. Subsequently a 5% aqueous initiator solution of t-butyl hydroperoxide (18.20 g) and a 1% aqueous solution of ferric ethylene diamine tetraacetic acid (4.63 g) was added to the reaction mixture. The free radical polymerisation was started by the addition of a 1% aqueous isoascorbic acid solution (45.24 g). The reaction mixture was allowed to drift to the peak temperature, 51° C. Then an additional amount of the aqueous isoascorbic acid solution (45.24 g) was added. The reaction mixture was homogenised for 15 minutes, then cooled to room temperature, filtered and collected. The dispersion of P2 had a solids content of 37.4% wt % and a pH of 7.6.

Preparation of a Blend of Oligomer Dispersion DA2 and Dispersed Polymer P2=A2P2

A 1 L round bottom flask, equipped with a stirrer, was loaded with DA2 (355.9 g) under a nitrogen atmosphere and subsequently dispersion P2 (500 g) was added while stirring the mixture. The blend was stirred for an additional 20 minutes at room temperature. The blend had a solids content of 36.4 wt %, and a pH of 6.8. Subsequently ammonia (10% in water) was added until the pH reached 8.9.

Pigmented Paint Composition Comprising A2P2 with Thickeners and Pigments.

A 500 cm³ jar, equipped with a stirrer, was loaded with the components listed in Table 3 below. Comparative Example 2 is the reference formulation as referred to above.

TABLE 3

|  | Example 2 | Comparative Example 2 |
|---|---|---|
| Components (g) |  |  |
| 1. A2P2 | 63.0 | 60.2 |
| 2. Water | 9.3 | 9.1 |
| 3. AMP-90 | — | 0.2 |
| 4. Dehydran ™ 1293 | 1.5 | 1.6 |
| 5. Surfynol ™ 104E | — | 0.7 |
| 6. Disperbyk ™ 190 | 0.9 | — |
| 7. NeoCryl ™ BT24 | — | 3.3 |
| 8. Kronos ™ 2190 | 24.9 | — |
| 9. Kronos ™ 2044 | — | 24.3 |
| 10. Borchigel ™ L75N (1:1) | — | 0.5 |
| 11. Rheo ™ 2000 | 0.4 | — |
| Pigment Volume Concentration | 20.7% | 20.5% |
| Low shear viscosity (mPa · s)[1] 6 rpm | 3600 | 4600 |
| Open time (min) | 9 | 4 |
| Dust-free time (min) | 10 | 10 |
| Tack-free time (min) | 15 | 15 |
| Thumb-hard time (min) | 45 | 20 |
| Sandability (min) | 180 | 100 |
| König Hardness development |  |  |
| 4 hrs 23 +/− 3° C. | 64 | 67 |
| 4 days 23 +/− 3° C. | 76 | 73 |
| 16 hrs 52° C. | 73 | 77 |

[1]Viscosity determined by a Brookfield DV-II+ Viscometer, spindle #4

The shear ratio for Example 2 was 19.6 [with viscosities measured at shear rates of $10\ s^{-1}$ 10 and $10,000\ s^{-1}$] and the shear ratio was 8.7 [with viscosities measured at shear rates of $10\ s^{-1}$ and $1,000\ s^{-1}$].

The equilibrium viscosity of Example 2 was measured and is given below in Table 4.

TABLE 4

| Time (min) | Calculated solids (%) | Shear rate $0.1\ s^{-1}$ Viscosity (Pa · s) | Shear rate $1.0\ s^{-1}$ Viscosity (Pa · s) | Shear rate $10\ s^{-1}$ Viscosity (Pa · s) | Shear rate $100\ s^{-1}$ Viscosity (Pa · s) |
|---|---|---|---|---|---|
| 0 | 48.8 | 17.8 | 7.1 | 2.2 | 0.6 |
| 2 | 50.1 | 45.6 | 12.4 | 3.1 | 0.7 |
| 7 | 53.7 | 299 | 51.7 | 9 | 1.8 |
| 12 | 57.7 | 1400 | 230 | 36 | 6.6 |
| 17 | 61.9 | 7000 | 1000 | 156 | 25 |
| 22 | 66.4 | 100000 | 8600 | 1200 | 140 |
| 28.5 | 72.7 | 400000 | 34000 | 3100 | 619 |

EXAMPLE 3

Preparation of a Dispersed Self-crosslinkable Hyperbranched Oligomer (Poly-alkoxylated Adduct methoxypolyethyleneglycol750/succinic anhydride) DA3:

Stage 1: Preparation of a Carboxylic Acid Functional Methoxy-polyethylene Glycol.

A 2 L round bottom flask, equipped with stirrer, was loaded with methoxy-ene polyethylene glycol (Mn ca. 750; 1323.53 g) and succinic anhydride (176.47 g) in a nitrogen atmosphere. The reaction mixture was heated to 120° C. and was stirred at this temperature until all the anhydride had reacted, as judged from the Infra Red spectrum of the reaction mixture (the anhydride groups typically show two absorptions at 1785 $cm^{-1}$ and 1865 $cm^{-1}$, which disappeared and were replaced by a new ester carbonyl absorption at 1740 $cm^{-1}$). The clear liquid product was then cooled to 50° C. and collected. The product solidified when left undisturbed at ambient temperature.

Stage 2:

A 2 litre reactor flask fitted with a stirrer, a thermometer and a condenser fitted with a Dean-Stark condensate trap, was loaded with Boltorn™ H20 polyol (from Perstorp AB; 182.28 g), the methoxypolyethyleneglycol adduct as prepared above in stage 1 (351.33 g), Prifac™ 8961 (sunflower oil fatty acid, from Uniqema; 345.96 g) and Fastcat™ 2005 (stannous(II) chloride, from Elf-Atochem; 0.25 g) in a nitrogen atmosphere. The reaction mixture was heated to 230° C. and water was collected. The mixture was kept at 230° C. until an acid value of 6.1 mg KOH/g polyester was obtained. The oligomer A3 was then cooled to 50° C., collected and stored under nitrogen.

Stage 3:

A 1 L round bottom flask, equipped with a stirrer and a thermometer, was loaded with a portion of 181.8 g of the crosslinkable hyperbranched oligomer A3 prepared in stage 2 above, and the reactor was purged with nitrogen. Then 1-methyl-2-pyrrolidinone (50 g), dipropylene glycol monomethyl ether (18.2 g) and DAPRO™ 5005 (ex Elementis Specialties) (4.55 g) were added and the contents of the reactor were stirred for 15 minutes at 50° C. Then N-dimethyl ethanolamine (2.42 g) was added and the mixture was stirred for an additional 15 minutes at 50° C. Finally, hot water (50° C.; 197.5 g) was slowly added to the mixture while the temperature was kept at 50° C. The final dispersion DA3 was homogenised for an additional 15 minutes, then cooled to ambient temperature, filtered and stored under nitrogen. The polyester oligomer dispersion DA3 had a solids content of 40 wt % and the pH was 7.7.

Preparation of a Sequential Dispersed Vinyl Polymer P3

A 2 L round bottom glass reactor, equipped with stirrer, thermometer and vortex breakers, was loaded with demineralised water (990.94 g), sodium lauryl sulfate (30%, 0.55 g) and sodium bicarbonate, (4.44 g) in a nitrogen atmosphere. The mixture was heated whilst stirring to 80° C. and then a solution of ammonium persulfate (0.89 g) in demineralised water (5.00 g) was added. In a dropping funnel a monomer mixture was prepared by stirring methylmethacrylate (140.48 g), n-butylacrylate (207.71 g) and acrylic acid (7.11 g). 10% of this mixture was added to the reactor at 80° C. The remainder was fed into the reactor over a period of 40 minutes at 85° C. The content of a separate dropping funnel, containing demineralised water (20.00 g), ammonium persulfate (0.36 g) and sodium lauryl sulfate 30% (11.62 g) was added in the same time. The reactor content was kept at 85° C. for 30 minutes. A second monomer mixture was prepared in a dropping funnel consisting methyl methacrylate (464.91 g), n-butylacrylate (57.37 g) and acrylic acid (10.66 g). The mixture was fed to the reactor after the 30 minutes period in 60 minutes. The content of a separate dropping funnel, containing demineralised water (30.00 g), ammonium persulfate (0.53 g) and sodium lauryl sulfate 30% (17.44 g) was added in the same time. The reactor content was kept at 85° C. for 45 minutes and then cooled to ambient temperature. The pH was adjusted to 8 to 8.5 with 12.5% aqueous ammonia. The resultant product P3 was filtered and collected. The solids content of this latex is 46.2%. The vinyl polymer latex, which is an acrylic polymer latex, has a particle size of 228 nm and a pH of 8.1.

Preparation of a Blend of Oligomer Dispersion DA3 and Dispersed Polymer P3=A3P3

A 1 L round bottom flask, equipped with a stirrer, was loaded with DA3 (300 g) in a nitrogen atmosphere and subsequently dispersion P3 (605.8 g) was added while stirring the mixture. The blend was stirred for an additional 20 minutes at room temperature. The blend had a solids content of 44.3 wt % and a pH of 7.6. Subsequently ammonia (10% in water) was added until the pH reached 9.2

Pigmented Paint Composition Comprising A3P3 with Thickeners and Pigments.

A 500 cm³ jar, equipped with a stirrer, was loaded with the components listed in Table 5 below. Comparative Example 3 is the reference formulation as referred to above.

TABLE 5

| | Example 3 | Comparative Example 3 |
|---|---|---|
| Components (g) | | |
| 1. A3P3 | 77.3 | 75.1 |
| 2. Water | 5.5 | 5 |
| 3. AMP-90 | — | 0.1 |
| 4. Dehydran ™ 1293 | 1.3 | 1.4 |
| 5. Surfynol ™ 104E | — | 0.5 |
| 6. Disperbyk ™ 190 | 0.5 | — |
| 7. NeoCryl ™ BT24 | — | 1.8 |
| 8. Tioxide ™ TR-92 | 14.8 | — |
| 9. Kronos ™ 2044 | — | 13.4 |
| 10. Borchigel ™ L75N (1:1) | — | 2.7 |
| 11. Rheo ™ 2000 | 0.6 | — |
| Pigment Volume Concentration | 9.6% | 9.6% |
| Low shear viscosity (mPa·s)¹ 6 rpm | 4000 | 3600 |
| Open time (min) | 9 | 6 |
| Dust-free time (min) | 5 | 5 |
| Tack-free time (min) | 45 | 15 |
| Thumb-hard time (min) | 300 | 160 |
| König Hardness development: | | |
| 4 hrs 23 +/− 3° C. | 4 hrs RT | 4 hrs RT |
| 4 days 23 +/− 3° C. | 4 days RT | 4 days RT |
| 16 hrs 52° C. | 16 hrs 52° C. | 16 hrs 52° C. |

¹Viscosity determined by a Brookfield DV-II+ Viscometer, spindle #4

The shear ratio for Example 3 was 11.3 [with viscosities measured at shear rates of 10 s⁻¹ and 10,000 s⁻¹] and the shear ratio was 7.4 [with viscosities measured at shear rates of 10 s⁻¹ and 1,000 s⁻¹].

The equilibrium viscosity of Example 3 was measured and is given below in Table 6.

TABLE 6

| Time (min) | Calculated solids (%) | Shear rate 0.1 s⁻¹ Viscosity (Pa·s) | Shear rate 1.0 s⁻¹ Viscosity (Pa·s) | Shear rate 10 s⁻¹ Viscosity (Pa·s) | Shear rate 100 s⁻¹ Viscosity (Pa·s) |
|---|---|---|---|---|---|
| 0 | 50 | 28.9 | 4.7 | 0.9 | 0.2 |
| 2 | 51.5 | 51 | 8.2 | 1.6 | 0.4 |
| 8 | 56.3 | 166 | 28.4 | 5.6 | 1.4 |
| 12 | 59.7 | 995 | 159 | 27.9 | 6.8 |
| 18 | 65.2 | 3700 | 581 | 99 | 17 |
| 23 | 70.2 | 130000 | 520000 | 9200 | — |

The invention claimed is:

1. An aqueous coating composition with an improved open time comprising:
    a) 1 to 35 wt % of a crosslinkable water-dispersible oligomer(s);
    b) 4 to 50 wt % of a dispersed polymer(s);
    c) 3 to 75 wt % of at least one pigment with an oil absorption number ≦25 g oil/100 g pigment;
    d) 0 to 10 wt % of at least one Newtonian-like thickener;
    e) 0 to 10 wt % of at least one thixotropic thickener;
    f) 0 to 20 wt % of co-solvent;
    g) 10 to 80 wt % of water;
    where a)+b)+c)+d)+e)+f)+g)=100%; wherein
    the weight ratio of a):b) is in the range of from 10:90 to 60:40; and wherein
    d)+e)=0.1 to 10 wt % and impart a shear ratio to the composition which is in the range of from 1 to 20 at a shear rate of 10 s⁻¹ and 1,000 s⁻¹, and wherein
    the composition when drying to form a coating has a tack-free time of ≦24 hours.

2. An aqueous composition according to claim 1 wherein the crosslinkable oligomer(s) is a self-crosslinkable oligomer(s).

3. An aqueous composition according to claim 1 wherein the crosslinkable oligomer(s) is selected from a group consisting of polyurethane oligomer(s), vinyl oligomer(s), polyamide oligomer(s), polyether oligomer(s), polysiloxane oligomer(s), polyester oligomer(s), hyperbranched oligomer(s) and/or mixtures thereof.

4. An aqueous composition according to claim 1 wherein the crosslinkable oligomer(s) has an acid value in the range of from 0 to 80 mg KOH/g.

5. An aqueous composition according to claim 1 wherein the crosslinkable oligomer(s) has a measured weight average molecular weight in the range of from 1,000 to 100,000 Daltons.

6. An aqueous composition according to claim 1 wherein the crosslinkable oligomer(s) is less than 70% by weight soluble in water throughout a pH range of from 2 to 10.

7. An aqueous composition according to claim 1 wherein the crosslinkable oligomer(s) has a measured Tg in the range of from −120 to 250° C.

8. An aqueous composition according to claim 1 wherein the dispersed polymer(s) has a measured weight average molecular weight ≦110,000 Daltons.

9. An aqueous composition according to claim 1 wherein the dispersed polymer(s) has an average particle size in the range of from 25 to 1000 nm.

10. An aqueous composition according to claim 1 wherein the dispersed polymer(s) has a measured Tg in the range of from −50 to 300° C.

11. An aqueous composition according to claim 1 wherein the dispersed polymer(s) is a vinyl polymer.

12. An aqueous composition according to claim 11 wherein the dispersed vinyl polymer has 10 to 50 wt % of a soft part with a measured Tg in the range of from −30 to 20° C. and 50 to 90 wt % of a hard part with a measured Tg in the range of from 60 to 110° C.

13. An aqueous composition according to claim 11 wherein the dispersed vinyl polymer(s) comprises:
    I. 15 to 80 wt % of styrene and/or α-methylstyrene;
    II. 0 to 50 wt % of one or more of methyl (meth)acrylate, ethyl (meth)acrylate, cyclohexyl (meth)acrylate and n-butyl (meth)acrylate;
    III. 0 to 7 wt % of a vinyl monomer(s) containing a carboxylic acid group(s);

IV. 0 to 10 wt % of a vinyl monomer(s) containing a non-ionic water-dispersing group(s);
V. 5 to 40 wt % of a vinyl monomer(s) other than as in I to IV, VI and VII;
VI. 0 to 5 wt % of a vinyl monomer(s) containing wet adhesion promoter or crosslinker groups (excluding any within the scope of III and VII); and
VII. 0 to 8 wt % of a polyethylenically unsaturated vinyl monomer, wherein I)+II) add up to at least 50% and I+II+III+IV+V+VI+VII add up to 100%.

14. An aqueous composition according to claim 1 wherein the pigment volume concentration is in the range of from 1 to 48 wt %.

15. An aqueous composition according to claim 1 wherein the pigment(s) has a water absorption number $\leq 40$ cm$^3$/100 g pigment.

16. An aqueous composition according to claim 1 wherein the composition comprises 0.1 to 10 wt % of d) the Newtonian-like thickener.

17. An aqueous composition according to claim 1 wherein the composition comprises 0.1 to 10 wt % of e) the thixotropic thickener.

18. An aqueous composition according to claim 1 wherein the ratio of Newtonian-like to thixotropic thickener is in the range of from 95:5 to 30:70.

19. An aqueous composition according to claim 1 wherein the co-solvent to water ratio is below 0.8.

20. An aqueous composition according to claim 1 wherein the improved open time is at least 3 minutes longer than a reference formulation which comprises similar amounts of components a), b), f) and g), a pigment with an oil absorption number >32 g oil/100 g pigment, and a pseudoplastic thickener.

21. An aqueous composition according to claim 1 wherein the open time is at least 9 minutes.

22. An aqueous composition according to claim 1 wherein said composition has an equilibrium viscosity $\leq 500$ Pa·s, during the first 10 minutes of drying when measured using any shear rate in the range of from $0.01 \pm 0.005$ to $900 \pm 5$ s$^{-1}$ and at 23+/−2° C.

23. A coating obtained from an aqueous composition according to claim 1.

24. A method for coating a substrate using an aqueous composition according to claim 1.

25. A substrate coated with an aqueous composition according to claim 1.

* * * * *